(12) United States Patent
Fullerton et al.

(10) Patent No.: US 7,834,729 B2
(45) Date of Patent: Nov. 16, 2010

(54) CORRELATED MAGNETIC CONNECTOR AND METHOD FOR USING THE CORRELATED MAGNETIC CONNECTOR

(75) Inventors: Larry W. Fullerton, New Hope, AL (US); Mark D. Roberts, Huntsville, AL (US)

(73) Assignee: Cedar Redge Research, LLC, New Hope, AL (US)

( * ) Notice: Subject to any disclaimer, the term of this patent is extended or adjusted under 35 U.S.C. 154(b) by 0 days.

(21) Appl. No.: 12/783,409

(22) Filed: May 19, 2010

(65) Prior Publication Data

US 2010/0225430 A1  Sep. 9, 2010

Related U.S. Application Data

(63) Continuation-in-part of application No. 12/476,952, filed on Jun. 2, 2009.

(51) Int. Cl.
*H01F 7/02* (2006.01)
*H01F 7/20* (2006.01)
*A44B 1/04* (2006.01)

(52) U.S. Cl. .................... 335/306; 335/285; 24/303

(58) Field of Classification Search ............. 335/285, 335/302–306; 24/303
See application file for complete search history.

(56) References Cited

U.S. PATENT DOCUMENTS

| | | | |
|---|---|---|---|
| 381,968 A | 5/1888 | Tesla | |
| 493,858 A | 3/1893 | Edison | |
| 996,933 A | 7/1911 | Lindquist | |
| 1,236,234 A | 8/1917 | Troje | |
| 2,389,298 A | 11/1945 | Ellis | |
| 2,570,625 A | 10/1951 | Zimmerman et al. | |
| 2,722,617 A | 11/1955 | Cluwen et al. | |
| 2,932,545 A | 4/1960 | Foley | |
| 3,102,314 A | 9/1963 | Alderfer | |
| 3,208,296 A | 9/1965 | Baermann | |
| 3,288,511 A | 11/1966 | Tavano | |
| 3,468,576 A | 9/1969 | Beyer et al. | |
| 3,474,366 A | 10/1969 | Barney | |
| 3,802,034 A | 4/1974 | Bookless | |
| 4,079,558 A | 3/1978 | Gorham | |
| 4,222,489 A | 9/1980 | Hutter | |

(Continued)

FOREIGN PATENT DOCUMENTS

FR  823395  1/1938

(Continued)

OTHER PUBLICATIONS

"BNS Series-Compatible Series AES Safety Controiters" pp. 1-17, http://www.schmersalusa.com/safety_controllers/drawings/aes.pdf (downloaded on or before Jan. 23, 2009).

(Continued)

*Primary Examiner*—Ramon M Barrera
(74) *Attorney, Agent, or Firm*—William J. Tucker

(57) ABSTRACT

A connector (e.g., electrical connector, fluid connector, gas connector) is described herein that incorporates correlated magnets which enable a first part to be securely attached to and removed from a second part. In addition, a method is described herein for using the connector to attach and remove the first part to and from the second part.

23 Claims, 14 Drawing Sheets

U.S. PATENT DOCUMENTS

| | | |
|---|---|---|
| 4,453,294 A | 6/1984 | Morita |
| 4,547,756 A | 10/1985 | Miller et al. |
| 4,629,131 A | 12/1986 | Podell |
| 4,941,236 A | 7/1990 | Sherman |
| 5,050,276 A | 9/1991 | Pemberton |
| 5,367,891 A | 11/1994 | Furuyama |
| 5,383,049 A | 1/1995 | Carr |
| 5,631,093 A | 5/1997 | Perry et al. |
| 5,631,618 A | 5/1997 | Trumper et al. |
| 5,956,778 A | 9/1999 | Godoy |
| 5,983,406 A | 11/1999 | Meyerrose |
| 6,072,251 A | 6/2000 | Markle |
| 6,115,849 A | 9/2000 | Meyerrose |
| 6,170,131 B1 | 1/2001 | Shin |
| 6,275,778 B1 | 8/2001 | Shimada et al. |
| 6,457,179 B1 | 10/2002 | Prendergast |
| 6,607,304 B1 | 8/2003 | Lake et al. |
| 6,720,698 B2 | 4/2004 | Galbraith |
| 6,847,134 B2 | 1/2005 | Frissen et al. |
| 6,862,748 B2 | 3/2005 | Prendergast |
| 6,927,657 B1 | 8/2005 | Wu |
| 6,971,147 B2 | 12/2005 | Haltstead |
| 7,066,778 B2 | 6/2006 | Kretzschmar |
| 7,362,018 B1 | 4/2008 | Kulogo et al. |
| 7,444,683 B2 | 11/2008 | Prendergast et al. |
| 2004/0003487 A1 | 1/2004 | Reiter |
| 2006/0066428 A1 | 3/2006 | McCarthy et al. |
| 2006/0189259 A1 | 8/2006 | Park |
| 2006/0290451 A1 | 12/2006 | Prendergast et al. |
| 2008/0186683 A1 | 8/2008 | Ligtenberg et al. |
| 2008/0272868 A1 | 11/2008 | Prendergast et al. |
| 2008/0282517 A1 | 11/2008 | Claro |

FOREIGN PATENT DOCUMENTS

| | | |
|---|---|---|
| WO | 2007081830 A2 | 7/2007 |

OTHER PUBLICATIONS

"Magnetic Safety Sensors" pp. 1-3, http://farnell.com/datasheets/6465.pdf (downloaded on or before Jan. 23, 2009).

"Series BNS-B20 Coded-Magnet Sensor Safety Door Handle" pp. 1-2, http://www.schmersalusa.com/catalog_pdfs/BNS_B20.pdf (downloaded on or before Jan. 23, 2009).

"Series BNS333 Coded-Magnet Sensors with Integrated Safety Control Module" pp. 1-2, http://www.schmersalusa.com/machine_guarding/coded_magnet/drawings/bns333.pdf (downloaded on or before Jan. 23, 2009).

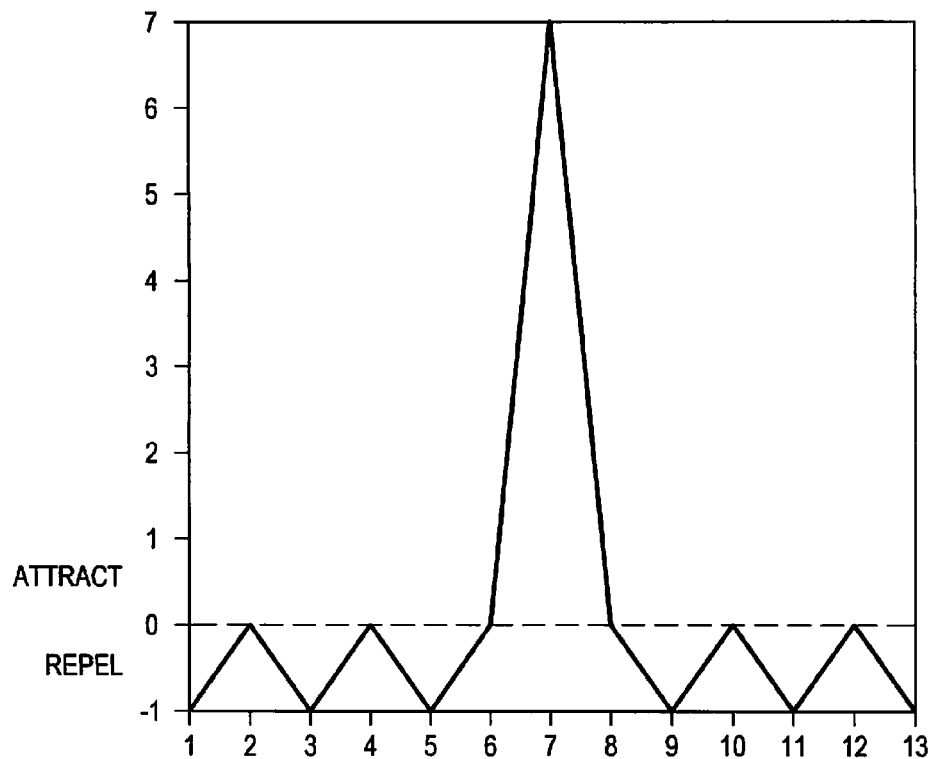
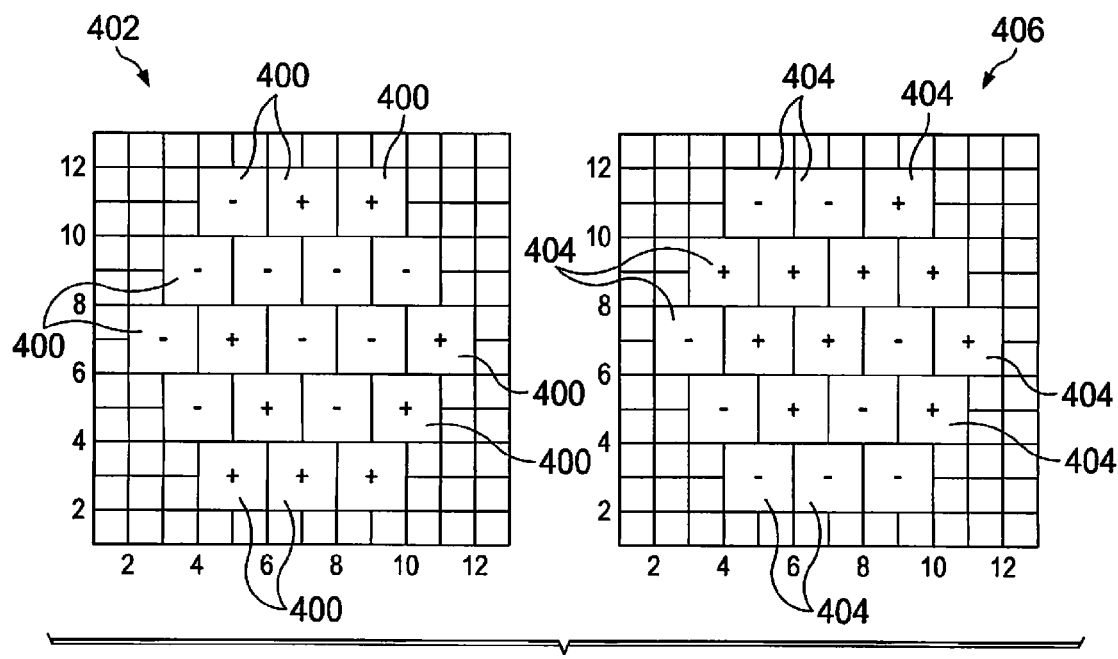

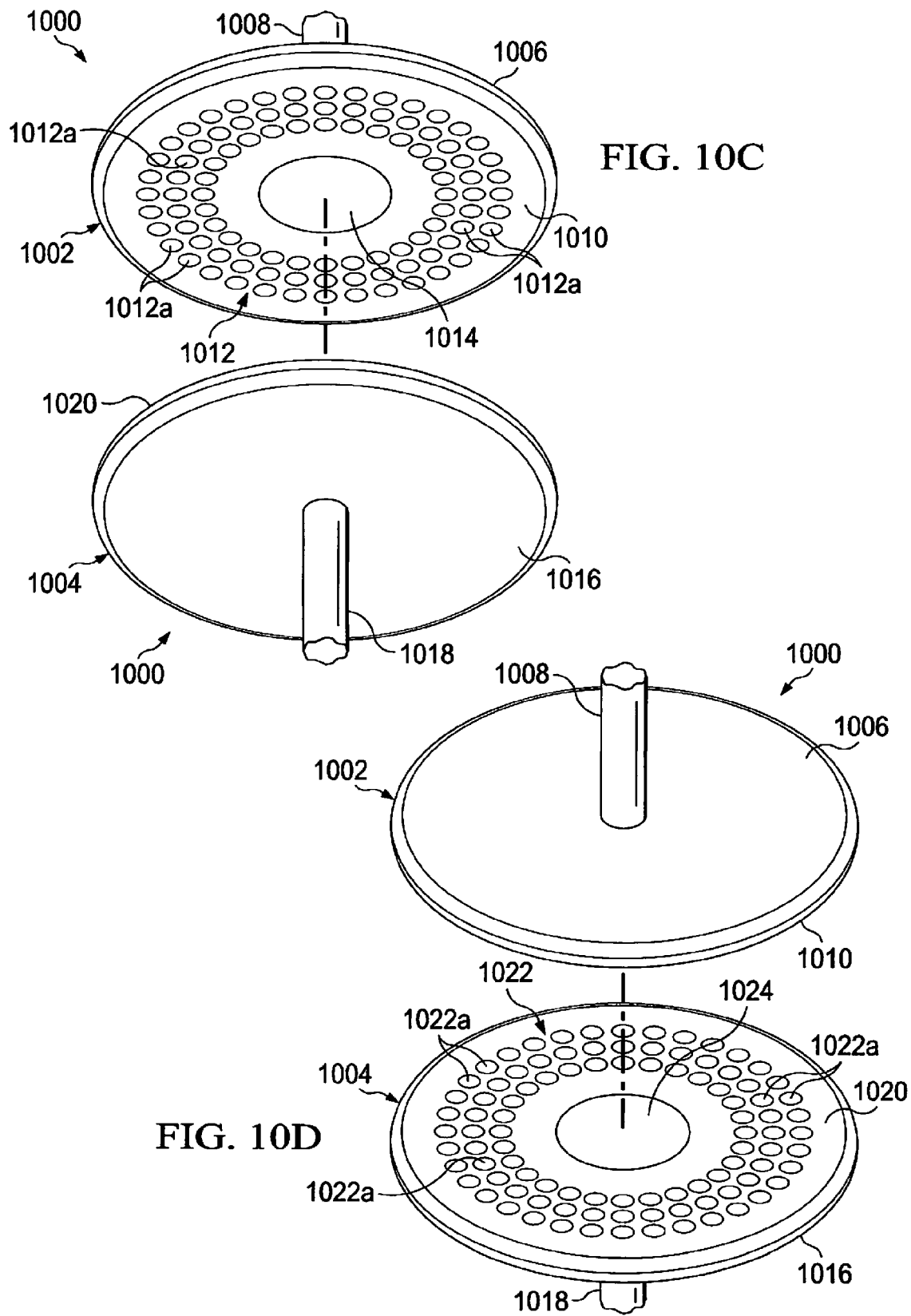

US 7,834,729 B2

CORRELATED MAGNETIC CONNECTOR AND METHOD FOR USING THE CORRELATED MAGNETIC CONNECTOR

CROSS REFERENCE TO RELATED APPLICATIONS

This application is a continuation-in-part application of U.S. patent application Ser. No. 12/476,952 filed on Jun. 2, 2009 and entitled "A Field Emission System and Method", which is a continuation-in-part application of U.S. patent application Ser. No. 12/322,561 filed on Feb. 4, 2009 and entitled "A System and Method for Producing an Electric Pulse", which is a continuation-in-part application of U.S. patent application Ser. No. 12/358,423 filed on Jan. 23, 2009 and entitled "A Field Emission System and Method", which is a continuation-in-part application of U.S. patent application Ser. No. 12/123,718 filed on May 20, 2008 and entitled "A Field Emission System and Method". The contents of these four documents are hereby incorporated herein by reference.

TECHNICAL FIELD

The present invention is related to a correlated magnetic connector that incorporates correlated magnets which enable a first end to be securely attached to and removed from a second end. In addition, the present invention is related to a method for using the correlated magnetic connector to attach and remove the first end to and from the second end.

DESCRIPTION OF RELATED ART

Manufacturers of connectors (e.g., electrical connectors, fluid connectors, gas connectors) are constantly trying to enhance their connectors so users can more easily and more effectively connect and disconnect two ends. One such advancement in connector technology is the subject of the present invention.

SUMMARY

In one aspect, the present invention provides a correlated magnetic connector which has a first end including a first magnetic field emission structure and a second end including a second magnetic field emission structure. The first end is attached to the second end when the first and second magnetic field emission structures are located next to one another and have a certain alignment with respect to one another. The first and second magnetic field emission structures each include field emission sources having positions and polarities relating to a desired spatial force function that corresponds to a relative alignment of the first and second magnetic field emission structures within a field domain. The spatial force function being in accordance with a code, where the code corresponding to a code modulo of the first field emission sources and a complementary code modulo of the second field emission sources. The code defining a peak spatial force corresponding to substantial alignment of the code modulo of the first field emission sources with the complementary code modulo of the second field emission sources. The code also defining a plurality of off peak spatial forces corresponding to a plurality of different misalignments of the code modulo of the first field emission sources and the complementary code modulo of the second field emission sources. The plurality of off peak spatial forces having a largest off peak spatial force, where the largest off peak spatial force being less than half of the peak spatial force. The first end can be released from the second end when the first magnetic field emission structure and the second magnetic field emission structure are turned (misaligned) with respect to one another.

In another aspect, the present invention provides a method for using a correlated magnetic connector which has a first end and a second end. The method includes the steps of (a) moving the first end which has a first magnetic field emission structure towards the second end which has a second magnetic field emission structure; and (b) turning the first end relative to the second end to align the first and second magnetic field emission structures so the first end attaches to the second end when the first and second magnetic field emission structures are located next to one another and have a certain alignment with respect to one another. The first and second magnetic field emission structures each include field emission sources having positions and polarities relating to a desired spatial force function that corresponds to a relative alignment of the first and second magnetic field emission structures within a field domain. The spatial force function being in accordance with a code, where the code corresponding to a code modulo of the first field emission sources and a complementary code modulo of the second field emission sources. The code defining a peak spatial force corresponding to substantial alignment of the code modulo of the first field emission sources with the complementary code modulo of the second field emission sources. The code also defining a plurality of off peak spatial forces corresponding to a plurality of different misalignments of the code modulo of the first field emission sources and the complementary code modulo of the second field emission sources. The plurality of off peak spatial forces having a largest off peak spatial force, where the largest off peak spatial force being less than half of the peak spatial force. The first end can be released from the second end when the first magnetic field emission structure and the second magnetic field emission structure are turned (misaligned) with respect to one another.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein:

FIGS. 10A-10D are several diagrams of an exemplary correlated magnetic connector in accordance with an embodiment of the present invention;

DETAILED DESCRIPTION

The present invention includes a connector (e.g., electrical connector, fluid connector, gas connector) that incorporates correlated magnets which enable a first end to be securely attached to and removed from a second end. The connector of the present invention is made possible, in part, by the use of an emerging, revolutionary technology that is called correlated magnetics. This revolutionary technology referred to herein as correlated magnetics was first fully described and enabled in the co-assigned U.S. patent application Ser. No. 12/123, 718 filed on May 20, 2008 and entitled "A Field Emission System and Method". The contents of this document are hereby incorporated herein by reference. A second generation of a correlated magnetic technology is described and enabled in the co-assigned U.S. patent application Ser. No. 12/358, 423 filed on Jan. 23, 2009 and entitled "A Field Emission System and Method". The contents of this document are hereby incorporated herein by reference. A third generation of a correlated magnetic technology is described and enabled in the co-assigned U.S. patent application Ser. No. 12/476, 952 filed on Jun. 2, 2009 and entitled "A Field Emission System and Method". The contents of this document are hereby incorporated herein by reference. Another technology known as correlated inductance, which is related to correlated magnetics, has been described and enabled in the co-assigned U.S. patent application Ser. No. 12/322,561 filed on Feb. 4, 2009 and entitled "A System and Method for Producing an Electric Pulse". The contents of this document are hereby incorporated by reference. A brief discussion about correlated magnetics is provided first before a detailed discussion is provided about the correlated magnetic connector and method of the present invention.

Correlated Magnetics Technology

This section is provided to introduce the reader to basic magnets and the new and revolutionary correlated magnetic technology. This section includes subsections relating to basic magnets, correlated magnets, and correlated electromagnetics. It should be understood that this section is provided to assist the reader with understanding the present invention, and should not be used to limit the scope of the present invention.

A. Magnets

Figure 1:
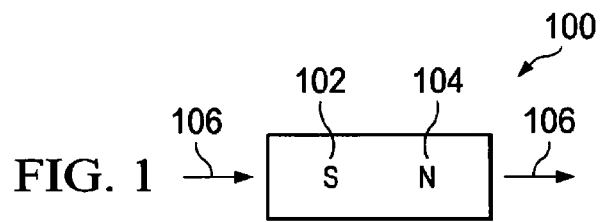
FIGS. 1-9 are various diagrams used to help explain different concepts about correlated magnetic technology which can be utilized in an embodiment of the present invention.

A magnet is a material or object that produces a magnetic field which is a vector field that has a direction and a magnitude (also called strength). Referring to FIG. 1, there is illustrated an exemplary magnet 100 which has a South pole 102 and a North pole 104 and magnetic field vectors 106 that represent the direction and magnitude of the magnet's moment. The magnet's moment is a vector that characterizes the overall magnetic properties of the magnet 100. For a bar magnet, the direction of the magnetic moment points from the South pole 102 to the North pole 104. The North and South poles 104 and 102 are also referred to herein as positive (+) and negative (−) poles, respectively.

Figure 2A:
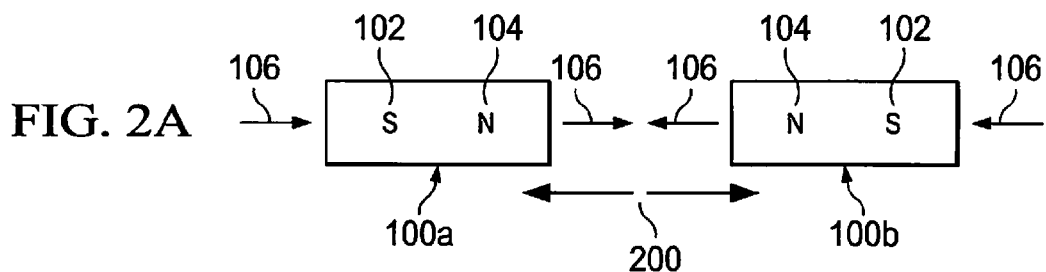
Figure 2B:
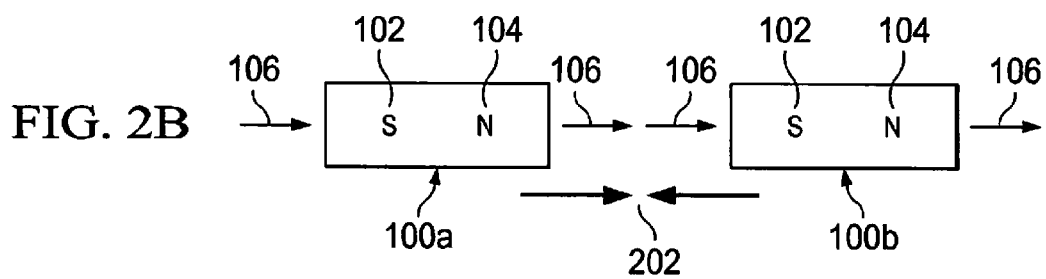
Figure 2C:
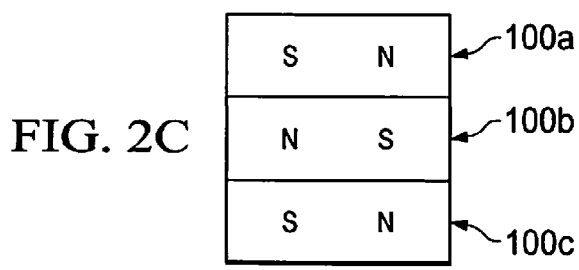

Referring to FIG. 2A, there is a diagram that depicts two magnets 100a and 100b aligned such that their polarities are opposite in direction resulting in a repelling spatial force 200 which causes the two magnets 100a and 100b to repel each other. In contrast, FIG. 2B is a diagram that depicts two magnets 100a and 100b aligned such that their polarities are in the same direction resulting in an attracting spatial force 202 which causes the two magnets 100a and 100b to attract each other. In FIG. 2B, the magnets 100a and 100b are shown as being aligned with one another but they can also be partially aligned with one another where they could still "stick" to each other and maintain their positions relative to each other. FIG. 2C is a diagram that illustrates how magnets 100a, 100b and 100c will naturally stack on one another such that their poles alternate.

B. Correlated Magnets

Correlated magnets can be created in a wide variety of ways depending on the particular application as described in the aforementioned U.S. patent application Ser. Nos. 12/123, 718, 12/358,432, and 12/476,952 by using a unique combination of magnet arrays (referred to herein as magnetic field emission sources), correlation theory (commonly associated with probability theory and statistics) and coding theory (commonly associated with communication systems). A brief discussion is provided next to explain how these widely diverse technologies are used in a unique and novel way to create correlated magnets.

Basically, correlated magnets are made from a combination of magnetic (or electric) field emission sources which have been configured in accordance with a pre-selected code having desirable correlation properties. Thus, when a magnetic field emission structure is brought into alignment with a complementary, or mirror image, magnetic field emission structure the various magnetic field emission sources will all align causing a peak spatial attraction force to be produced, while the misalignment of the magnetic field emission structures cause the various magnetic field emission sources to substantially cancel each other out in a manner that is a function of the particular code used to design the two magnetic field emission structures. In contrast, when a magnetic field emission structure is brought into alignment with a duplicate magnetic field emission structure then the various magnetic field emission sources all align causing a peak spatial repelling force to be produced, while the misalignment of the magnetic field emission structures causes the various magnetic field emission sources to substantially cancel each other out in a manner that is a function of the particular code used to design the two magnetic field emission structures.

The aforementioned spatial forces (attraction, repelling) have a magnitude that is a function of the relative alignment of two magnetic field emission structures and their corresponding spatial force (or correlation) function, the spacing (or distance) between the two magnetic field emission structures, and the magnetic field strengths and polarities of the various sources making up the two magnetic field emission structures. The spatial force functions can be used to achieve precision alignment and precision positioning not possible with basic magnets. Moreover, the spatial force functions can enable the precise control of magnetic fields and associated spatial forces thereby enabling new forms of attachment devices for attaching objects with precise alignment and new systems and methods for controlling precision movement of objects. An additional unique characteristic associated with correlated magnets relates to the situation where the various magnetic field sources making-up two magnetic field emission structures can effectively cancel out each other when they are brought out of alignment which is described herein as a release force. This release force is a direct result of the particular correlation coding used to configure the magnetic field emission structures.

A person skilled in the art of coding theory will recognize that there are many different types of codes that have different correlation properties which have been used in communications for channelization purposes, energy spreading, modulation, and other purposes. Many of the basic characteristics of such codes make them applicable for use in producing the magnetic field emission structures described herein. For example, Barker codes are known for their autocorrelation properties and can be used to help configure correlated magnets. Although, a Barker code is used in an example below with respect to FIGS. 3A-3B, other forms of codes which may or may not be well known in the art are also applicable to correlated magnets because of their autocorrelation, cross-correlation, or other properties including, for example, Gold codes, Kasami sequences, hyperbolic congruential codes, quadratic congruential codes, linear congruential codes, Welch-Costas array codes, Golomb-Costas array codes, pseudorandom codes, chaotic codes, Optimal Golomb Ruler codes, deterministic codes, designed codes, one dimensional codes, two dimensional codes, three dimensional codes, or four dimensional codes, combinations thereof, and so forth.

Figure 3A:
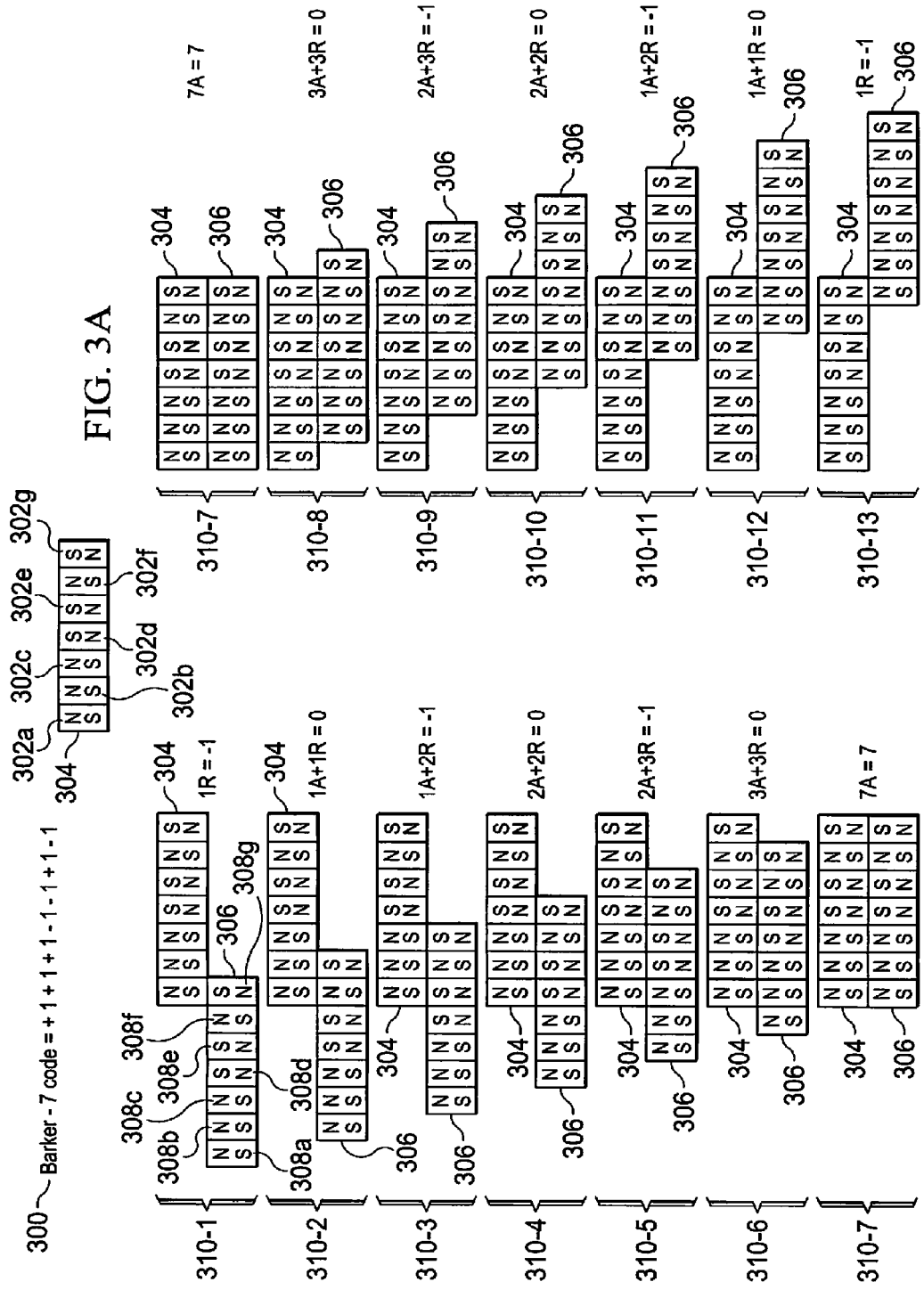

Referring to FIG. 3A, there are diagrams used to explain how a Barker length 7 code 300 can be used to determine polarities and positions of magnets 302a, 302b . . . 302g making up a first magnetic field emission structure 304. Each magnet 302a, 302b . . . 302g has the same or substantially the same magnetic field strength (or amplitude), which for the sake of this example is provided as a unit of 1 (where A=Attract, R=Repel, A=−R, A=1, R=−1). A second magnetic field emission structure 306 (including magnets 308a, 308b . . . 308g) that is identical to the first magnetic field emission structure 304 is shown in 13 different alignments 310-1 through 310-13 relative to the first magnetic field emission structure 304. For each relative alignment, the number of magnets that repel plus the number of magnets that attract is calculated, where each alignment has a spatial force in accordance with a spatial force function based upon the correlation function and magnetic field strengths of the magnets 302a, 302b . . . 302g and 308a, 308b . . . 308g. With the specific Barker code used, the spatial force varies from −1 to 7, where the peak occurs when the two magnetic field emission structures 304 and 306 are aligned which occurs when their respective codes are aligned. The off peak spatial force, referred to as a side lobe force, varies from 0 to −1. As such, the spatial force function causes the magnetic field emission structures 304 and 306 to generally repel each other unless they are aligned such that each of their magnets are correlated with a complementary magnet (i.e., a magnet's South pole aligns with another magnet's North pole, or vice versa). In other words, the two magnetic field emission structures 304 and 306 substantially correlate with one another when they are aligned to substantially mirror each other.

In FIG. 3B, there is a plot that depicts the spatial force function of the two magnetic field emission structures 304 and 306 which results from the binary autocorrelation function of the Barker length 7 code 300, where the values at each alignment position 1 through 13 correspond to the spatial force values that were calculated for the thirteen alignment positions 310-1 through 310-13 between the two magnetic field emission structures 304 and 306 depicted in FIG. 3A. As the true autocorrelation function for correlated magnet field structures is repulsive, and most of the uses envisioned will have attractive correlation peaks, the usage of the term 'auto-correlation' herein will refer to complementary correlation unless otherwise stated. That is, the interacting faces of two such correlated magnetic field emission structures 304 and 306 will be complementary to (i.e., mirror images of) each other. This complementary autocorrelation relationship can be seen in FIG. 3A where the bottom face of the first magnetic field emission structure 304 having the pattern 'S S S N N S N' is shown interacting with the top face of the second magnetic field emission structure 306 having the pattern 'N N N S S N S', which is the mirror image (pattern) of the bottom face of the first magnetic field emission structure 304.

Figure 4B:
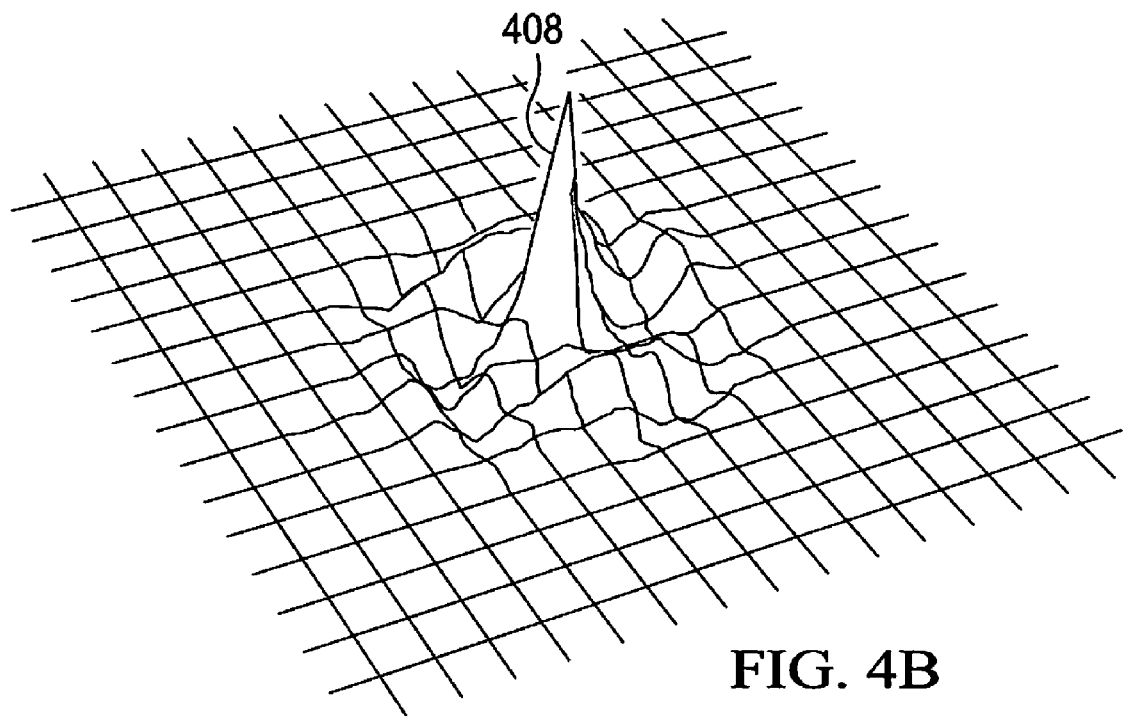
Figure 4C:
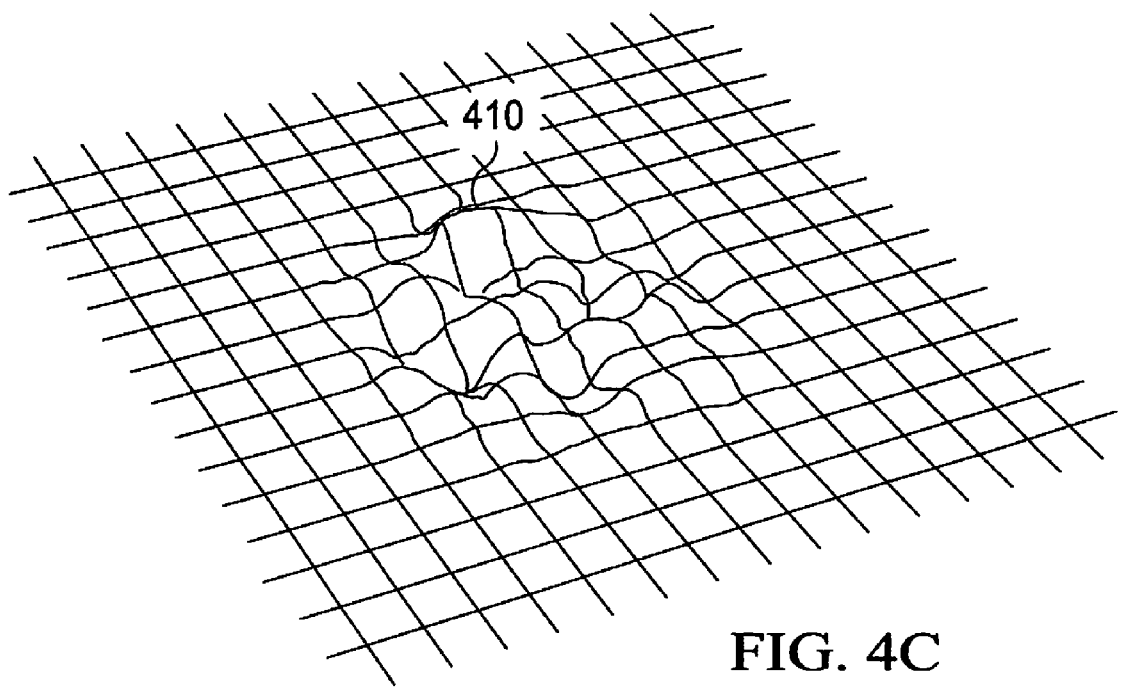

Referring to FIG. 4A, there is a diagram of an array of 19 magnets 400 positioned in accordance with an exemplary code to produce an exemplary magnetic field emission structure 402 and another array of 19 magnets 404 which is used to produce a mirror image magnetic field emission structure 406. In this example, the exemplary code was intended to produce the first magnetic field emission structure 402 to have a first stronger lock when aligned with its mirror image magnetic field emission structure 406 and a second weaker lock when it is rotated 90° relative to its mirror image magnetic field emission structure 406. FIG. 4B depicts a spatial force function 408 of the magnetic field emission structure 402 interacting with its mirror image magnetic field emission structure 406 to produce the first stronger lock. As can be seen, the spatial force function 408 has a peak which occurs when the two magnetic field emission structures 402 and 406 are substantially aligned. FIG. 4C depicts a spatial force function 410 of the magnetic field emission structure 402 interacting with its mirror magnetic field emission structure 406 after being rotated 90°. As can be seen, the spatial force function 410 has a smaller peak which occurs when the two magnetic field emission structures 402 and 406 are substantially aligned but one structure is rotated 90°. If the two magnetic field emission structures 402 and 406 are in other positions then they could be easily separated.

Figure 5:
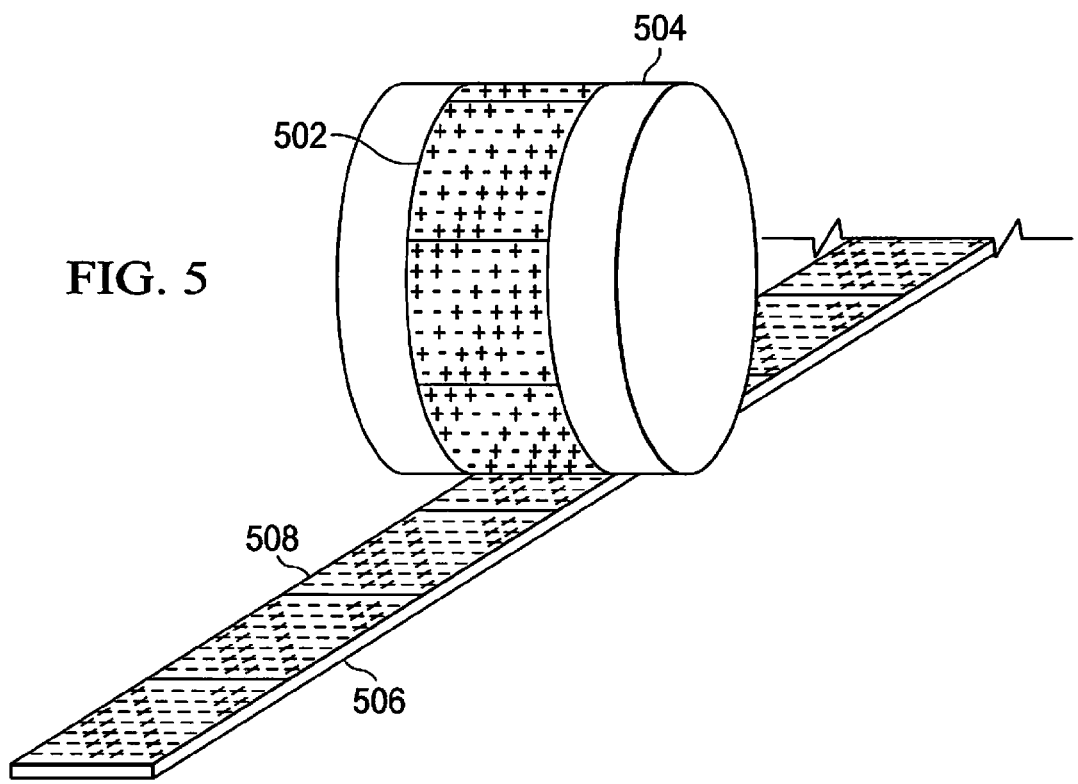

Referring to FIG. 5, there is a diagram depicting a correlating magnet surface 502 being wrapped back on itself on a cylinder 504 (or disc 504, wheel 504) and a conveyor belt/tracked structure 506 having located thereon a mirror image correlating magnet surface 508. In this case, the cylinder 504 can be turned clockwise or counter-clockwise by some force so as to roll along the conveyor belt/tracked structure 506. The fixed magnetic field emission structures 502 and 508 provide a traction and gripping (i.e., holding) force as the cylinder 504 is turned by some other mechanism (e.g., a motor). The gripping force would remain substantially constant as the cylinder 504 moved down the conveyor belt/tracked structure 506 independent of friction or gravity and could therefore be used to move an object about a track that moved up a wall, across a ceiling, or in any other desired direction within the limits of the gravitational force (as a function of the weight of the object) overcoming the spatial force of the aligning magnetic field emission structures 502 and 508. If desired, this cylinder 504 (or other rotary devices) can also be operated against other rotary correlating surfaces to provide a gear-like operation. Since the hold-down force equals the traction force, these gears can be loosely connected and still give positive, non-slipping rotational accuracy. Plus, the magnetic field emission structures 502 and 508 can have surfaces which are perfectly smooth and still provide positive, non-slip traction. In contrast to legacy friction-based wheels, the traction force provided by the magnetic field emission structures 502 and 508 is largely independent of the friction forces between the traction wheel and the traction surface and can be employed with low friction surfaces. Devices moving about based on magnetic traction can be operated independently of gravity for example in weightless conditions including space, underwater, vertical surfaces and even upside down.

Figure 6:
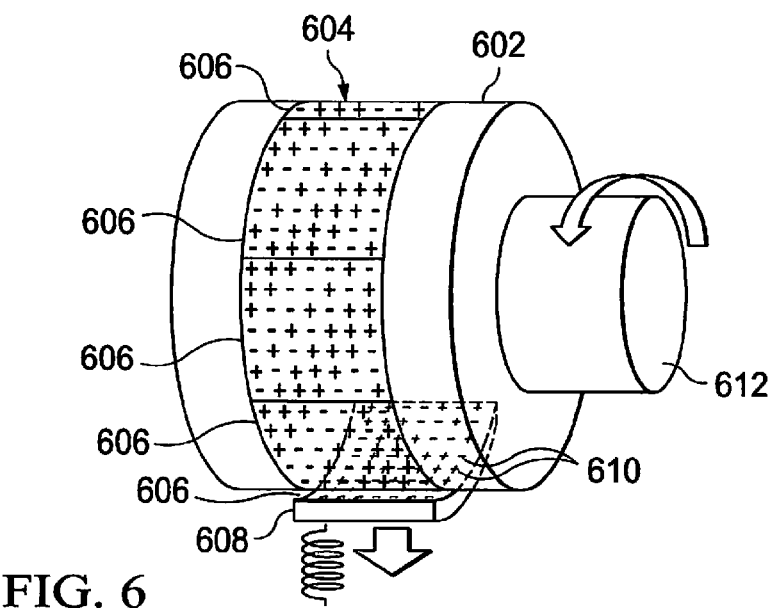

Referring to FIG. 6, there is a diagram depicting an exemplary cylinder 602 having wrapped thereon a first magnetic field emission structure 604 with a code pattern 606 that is repeated six times around the outside of the cylinder 602. Beneath the cylinder 602 is an object 608 having a curved surface with a slightly larger curvature than the cylinder 602 and having a second magnetic field emission structure 610 that is also coded using the code pattern 606. Assume, the cylinder 602 is turned at a rotational rate of 1 rotation per second by shaft 612. Thus, as the cylinder 602 turns, six times a second the first magnetic field emission structure 604 on the cylinder 602 aligns with the second magnetic field emission structure 610 on the object 608 causing the object 608 to be repelled (i.e., moved downward) by the peak spatial force function of the two magnetic field emission structures 604 and 610. Similarly, had the second magnetic field emission structure 610 been coded using a code pattern that mirrored code pattern 606, then 6 times a second the first magnetic field emission structure 604 of the cylinder 602 would align with the second magnetic field emission structure 610 of the object 608 causing the object 608 to be attracted (i.e., moved upward) by the peak spatial force function of the two magnetic field emission structures 604 and 610. Thus, the movement of the cylinder 602 and the corresponding first magnetic field emission structure 604 can be used to control the movement of the object 608 having its corresponding second magnetic field emission structure 610. One skilled in the art will recognize that the cylinder 602 may be connected to a shaft 612 which may be turned as a result of wind turning a windmill, a water wheel or turbine, ocean wave movement, and other methods whereby movement of the object 608 can result from some source of energy scavenging. As such, correlated magnets enables the spatial forces between objects to be precisely controlled in accordance with their movement and also enables the movement of objects to be precisely controlled in accordance with such spatial forces.

In the above examples, the correlated magnets 304, 306, 402, 406, 502, 508, 604 and 610 overcome the normal 'magnet orientation' behavior with the aid of a holding mechanism such as an adhesive, a screw, a bolt & nut, etc. . . . . . In other cases, magnets of the same magnetic field emission structure could be sparsely separated from other magnets (e.g., in a sparse array) such that the magnetic forces of the individual magnets do not substantially interact, in which case the polarity of individual magnets can be varied in accordance with a code without requiring a holding mechanism to prevent magnetic forces from 'flipping' a magnet. However, magnets are typically close enough to one another such that their magnetic forces would substantially interact to cause at least one of them to 'flip' so that their moment vectors align but these magnets can be made to remain in a desired orientation by use of a holding mechanism such as an adhesive, a screw, a bolt & nut, etc. . . . . As such, correlated magnets often utilize some sort of holding mechanism to form different magnetic field emission structures which can be used in a wide-variety of applications like, for example, a turning mechanism, a tool insertion slot, alignment marks, a latch mechanism, a pivot mechanism, a swivel mechanism, a lever, a drill head assembly, a hole cutting tool assembly, a machine press tool, a gripping apparatus, a slip ring mechanism, and a structural assembly.

C. Correlated Electromagnetics

Correlated magnets can entail the use of electromagnets which is a type of magnet in which the magnetic field is produced by the flow of an electric current. The polarity of the magnetic field is determined by the direction of the electric current and the magnetic field disappears when the current ceases. Following are a couple of examples in which arrays of electromagnets are used to produce a first magnetic field emission structure that is moved over time relative to a second magnetic field emission structure which is associated with an object thereby causing the object to move.

Figure 7:
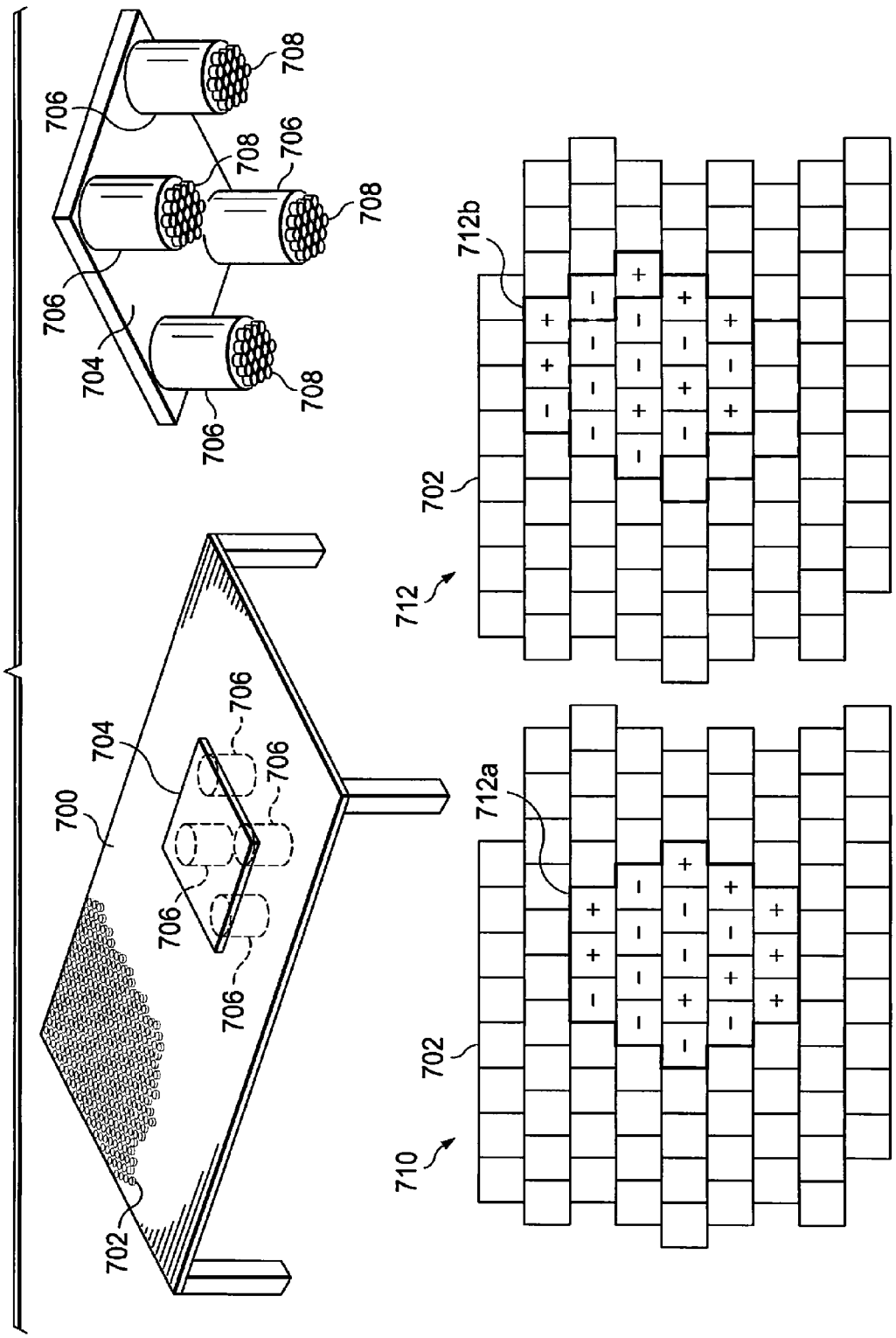

Referring to FIG. 7, there are several diagrams used to explain a 2-D correlated electromagnetics example in which there is a table 700 having a two-dimensional electromagnetic array 702 (first magnetic field emission structure 702) beneath its surface and a movement platform 704 having at least one table contact member 706. In this example, the movement platform 704 is shown having four table contact members 706 each having a magnetic field emission structure 708 (second magnetic field emission structures 708) that would be attracted by the electromagnetic array 702. Computerized control of the states of individual electromagnets of the electromagnet array 702 determines whether they are on or off and determines their polarity. A first example 710 depicts states of the electromagnetic array 702 configured to cause one of the table contact members 706 to attract to a subset 712a of the electromagnets within the magnetic field emission structure 702. A second example 712 depicts different states of the electromagnetic array 702 configured to cause the one table contact member 706 to be attracted (i.e., move) to a different subset 712b of the electromagnets within the field emission structure 702. Per the two examples, one skilled in the art can recognize that the table contact member(s) 706 can be moved about table 700 by varying the states of the electromagnets of the electromagnetic array 702.

Figure 8:
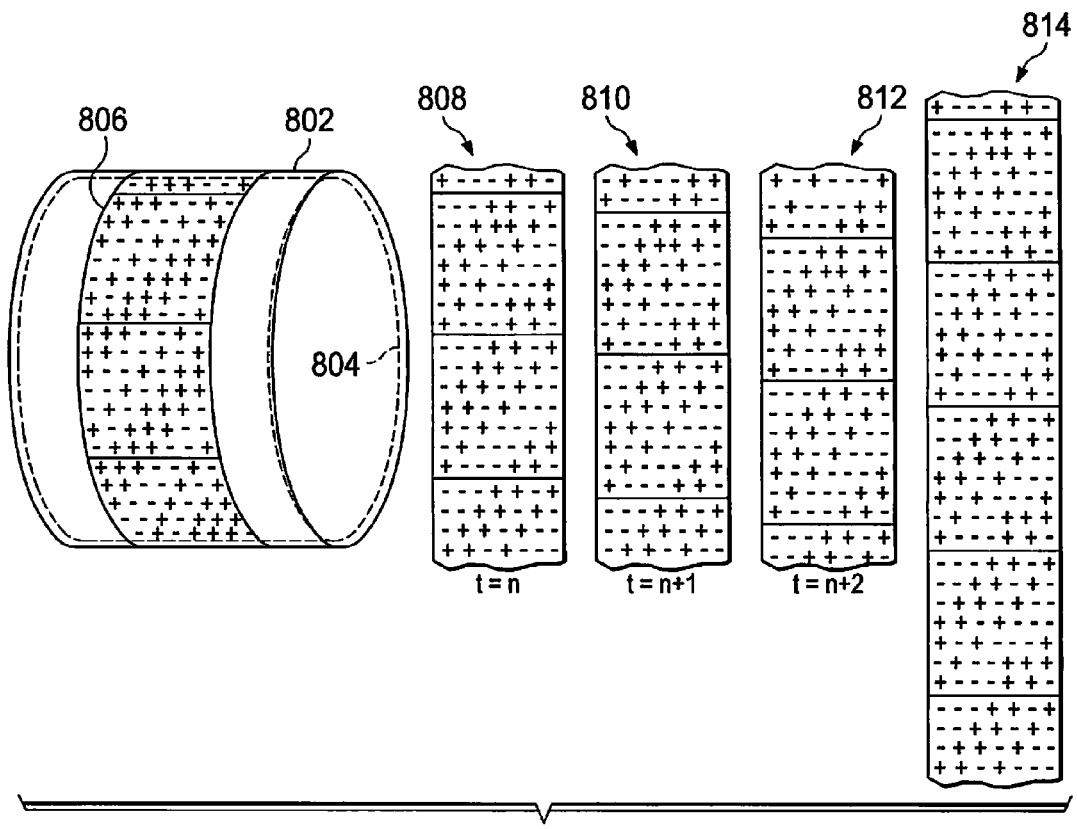

Referring to FIG. 8, there are several diagrams used to explain a 3-D correlated electromagnetics example where there is a first cylinder 802 which is slightly larger than a second cylinder 804 that is contained inside the first cylinder 802. A magnetic field emission structure 806 is placed around the first cylinder 802 (or optionally around the second cylinder 804). An array of electromagnets (not shown) is associated with the second cylinder 804 (or optionally the first cylinder 802) and their states are controlled to create a moving mirror image magnetic field emission structure to which the magnetic field emission structure 806 is attracted so as to cause the first cylinder 802 (or optionally the second cylinder 804) to rotate relative to the second cylinder 804 (or optionally the first cylinder 802). The magnetic field emission structures 808, 810, and 812 produced by the electromagnetic array on the second cylinder 804 at time t=n, t=n+1, and t=n+2, show a pattern mirroring that of the magnetic field emission structure 806 around the first cylinder 802. The pattern is shown moving downward in time so as to cause the first cylinder 802 to rotate counterclockwise. As such, the speed and direction of movement of the first cylinder 802 (or the second cylinder 804) can be controlled via state changes of the electromagnets making up the electromagnetic array. Also depicted in FIG. 8 there is an electromagnetic array 814 that corresponds to a track that can be placed on a surface such that a moving mirror image magnetic field emission structure can be used to move the first cylinder 802 backward or forward on the track using the same code shift approach shown with magnetic field emission structures 808, 810, and 812 (compare to FIG. 5).

Figure 9:
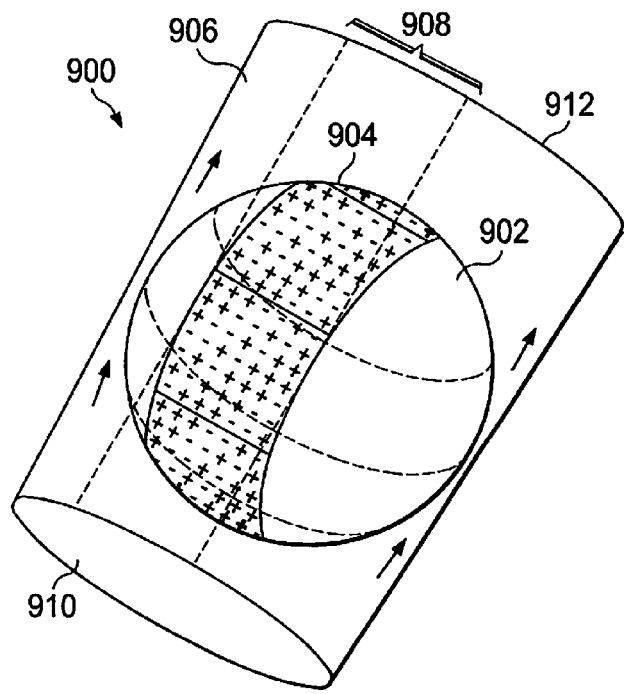

Referring to FIG. 9, there is illustrated an exemplary valve mechanism 900 based upon a sphere 902 (having a magnetic field emission structure 904 wrapped thereon) which is located in a cylinder 906 (having an electromagnetic field emission structure 908 located thereon). In this example, the electromagnetic field emission structure 908 can be varied to move the sphere 902 upward or downward in the cylinder 906 which has a first opening 910 with a circumference less than or equal to that of the sphere 902 and a second opening 912 having a circumference greater than the sphere 902. This configuration is desirable since one can control the movement of the sphere 902 within the cylinder 906 to control the flow rate of a gas or liquid through the valve mechanism 900. Similarly, the valve mechanism 900 can be used as a pressure control valve. Furthermore, the ability to move an object within another object having a decreasing size enables various types of sealing mechanisms that can be used for the sealing of windows, refrigerators, freezers, food storage containers, boat hatches, submarine hatches, etc., where the amount of sealing force can be precisely controlled. One skilled in the art will recognize that many different types of seal mechanisms that include gaskets, o-rings, and the like can be employed with the use of the correlated magnets. Plus, one skilled in the art will recognize that the magnetic field emission structures can have an array of sources including, for example, a permanent magnet, an electromagnet, an electret, a magnetized ferromagnetic material, a portion of a magnetized ferromagnetic material, a soft magnetic material, or a superconductive magnetic material, some combination thereof, and so forth.

Correlated Magnetic Connectors

Referring to FIGS. 10A-10D, there are diagrams of an exemplary correlated magnetic connector 1000 that includes a first part 1002 which can be attached to and released from a second part 1004 in accordance with an embodiment of the present invention. The first part 1002 has a first back surface 1006 that has connected thereto a first electrical cable 1008 (or tube 1008) and a first front surface 1010 that has a first field emission structure 1012 which is located around a first electrical contact area 1014 (or opening 1014) (see FIGS. 10A-10C). The first electrical cable 1008 (or tube 1008) is connected to the first electrical contact area 1014 (or opening 1014). Likewise, the second part 1004 has a second back surface 1016 that has connected thereto a second electrical cable 1018 (or tube 1018) and a second front surface 1020 that has a second magnetic field emission structure 1022 which is located around a second electrical contact area 1024 (or opening 1024) (see FIGS. 10A-10B and 10D). The second electrical cable 1018 (or tube 1018) is connected to the second electrical contact area 1024 (or opening 1024). In this example, the first field emission structure 1012 is depicted as being flush with the first front surface 1010. If desired the first field emission structure 1012 could be recessed within the first front surface 1010 such that it is not visible. Alternatively, the first field emission structure 1012 could extend out from the first front surface 1010. Likewise, the second magnetic field emission structure 1022 is depicted as being flush with the second front surface 1020. If desired the second magnetic field emission structure 1022 could be recessed within the second front surface 1020 such that it is not visible. Alternatively, the second magnetic field emission structure 1022 could extend out from the second front surface 1020.

Figure 10A:
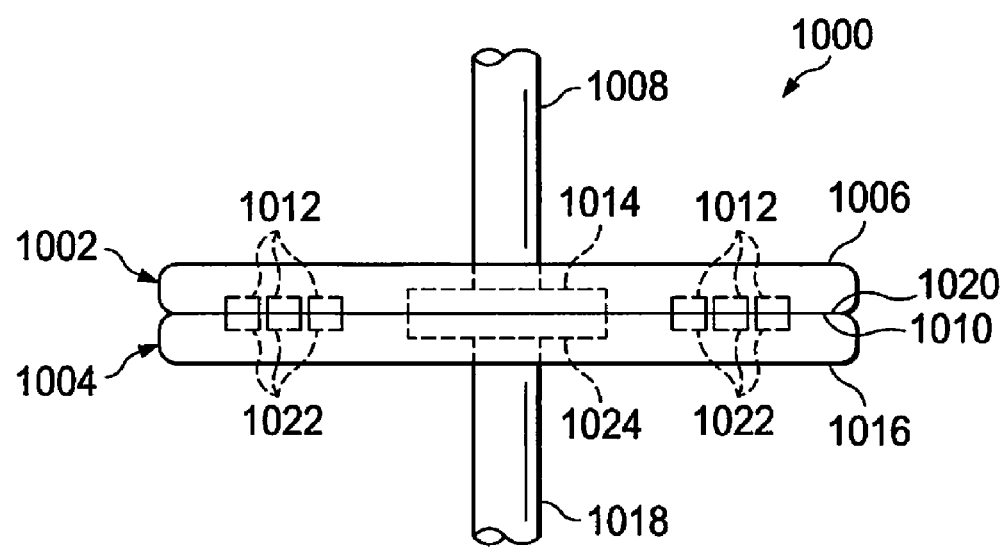
Figure 10B:
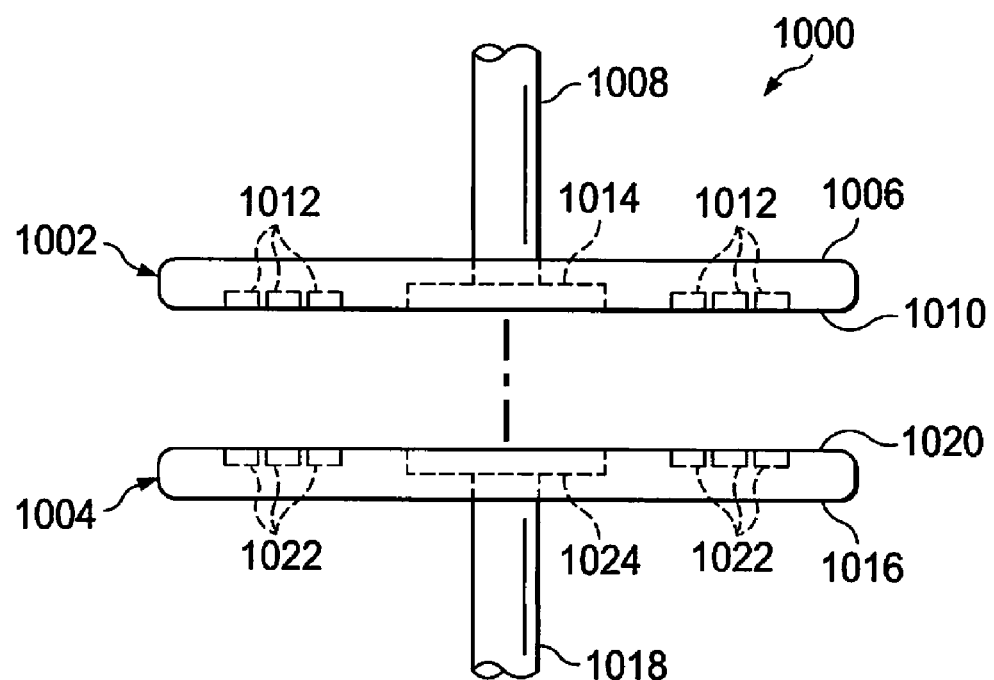

As shown in FIGS. 10A-10B, the first magnetic field emission structure 1012 is configured to interact (correlate) with the second magnetic field emission structure 1022 such that the first part 1002 can, when desired, be substantially aligned to become attached (secured) to the second part 1004 or misaligned to become removed (detached) from the second part 1004. In particular, the first part 1002 can be attached to the second part 1004 when their respective first and second magnetic field emission structures 1012 and 1022 are located next to one another and have a certain alignment with respect to one another (see FIG. 10A). In this case, the first part 1002 is attached (aligned) to the second part 1004 such that the first electrical contact area 1014 (or opening 1014) is connected to the second electrical contact area 1024 (or opening 1024). Under one arrangement, the first part 1002 is attached to the second part 1004 with a desired strength to prevent the first part 1002 from being inadvertently disengaged from the second part 1004. The first part 1002 can be released from the second part 1004 when their respective first and second magnetic field emission structures 1012 and 1022 are turned (misaligned) with respect to one another (see FIG. 10B). In this case, the first part 1002 would no longer be attached to the second part 1004 such that the first electrical contact area 1014 (or opening 1014) would no longer be connected to the second electrical contact area 1024 (or opening 1024). This is all possible because the first and second magnetic field emission structures 1012 and 1022 each comprise an array of field emission sources 1012a and 1022a (e.g., an array of magnets 1012a and 1022a) each having positions and polarities relating to a desired spatial force function that corresponds to a relative alignment of the first and second magnetic field emission structures 1012 and 1022 within a field domain (see discussion about correlated magnet technology). An example of how the first part 1002 can be attached (secured) to or removed from the second part 1004 is discussed in detail below with respect to FIGS. 11A-11I.

Figure 11A:
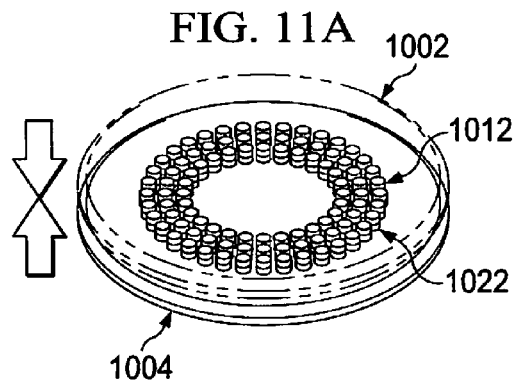
FIGS. 11A-11I are several diagrams that illustrate a portion of the correlated magnetic connector shown in FIGS. 10A-10D which are used to show how an exemplary first magnetic field emission structure (associated with a first end) and its mirror image second magnetic field emission structure (associated with a second end) can be aligned relative to each other to enable a person to secure the first end to the second end plus how the first magnetic field emission structure and second magnetic field emission structure can be misaligned relative to each other to enable a person to remove the first end from the second end.
Figure 11D:
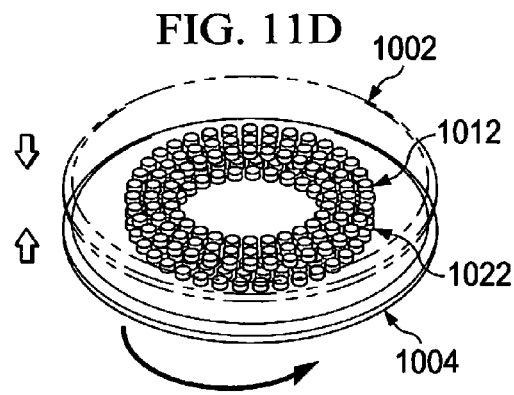
Figure 11B:
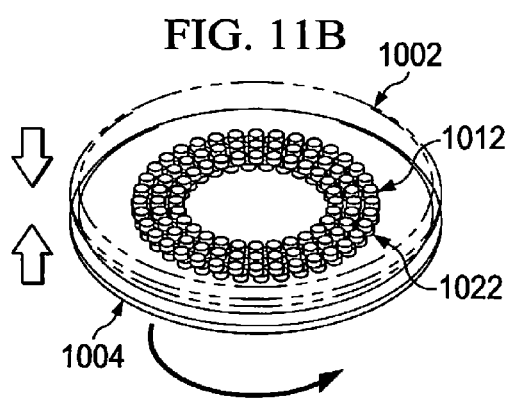
Figure 11E:
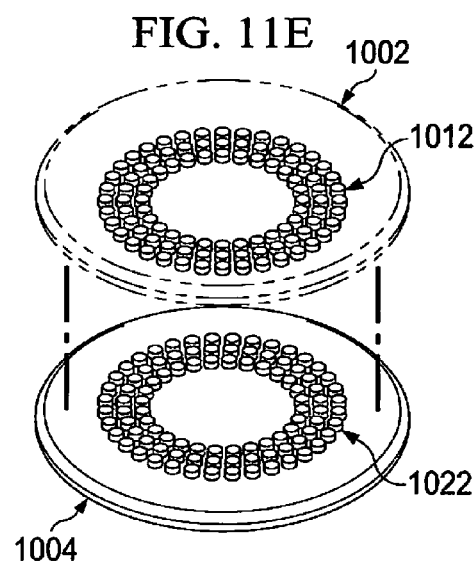
Figure 11C:
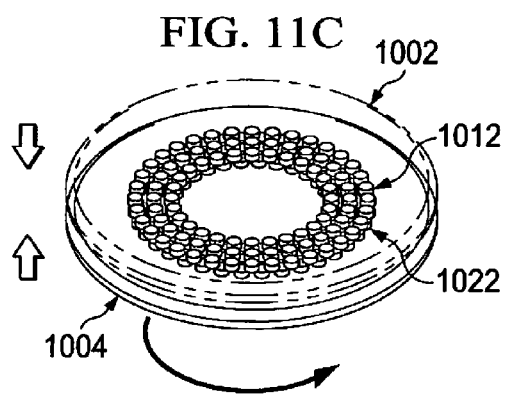
Figure 11F:
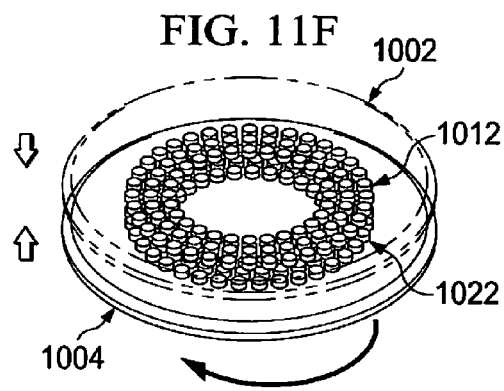
Figure 11G:
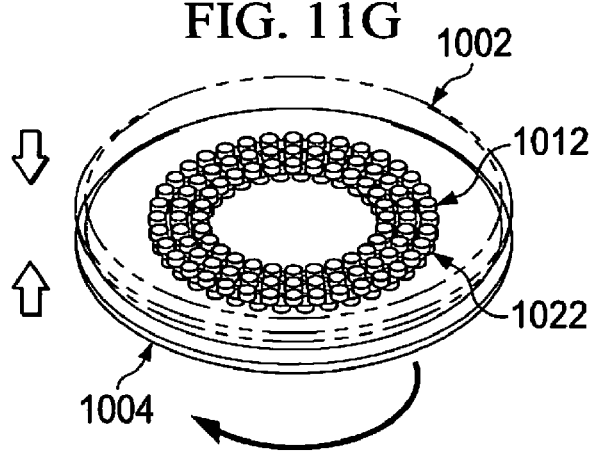
Figure 11H:
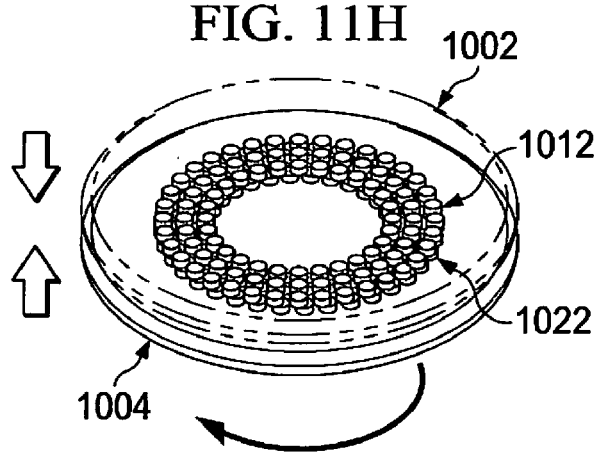
Figure 11I:
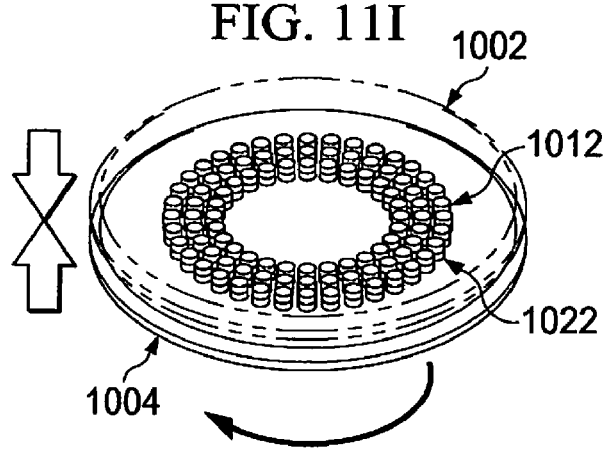

Referring to FIGS. 11A-11I, there is depicted an exemplary first magnetic field emission structure 1012 (attached to the first part 1002) and its mirror image second magnetic field emission structure 1022 (attached to the second part 1004) and the resulting spatial forces produced in accordance with their various alignments as they are twisted relative to each other which enables the user to secure or remove the first part 1002 to or from the second part 1004. In FIG. 11A, the first magnetic field emission structure 1012 and the mirror image second magnetic field emission structure 1022 are aligned producing a peak spatial force. In FIG. 11B, the first magnetic field emission structure 1012 is rotated clockwise slightly relative to the mirror image second magnetic field emission structure 1022 and the attractive force reduces significantly. To accomplish this, the user would normally grab and turn the first part 1002 (or second part 1004) relative to the second part 1004 (or first part 1002) to rotate the first magnetic field emission structure 1012 relative to the mirror image second magnetic field emission structure 1022. In FIG. 11C, the first magnetic field emission structure 1012 is further rotated and the attractive force continues to decrease. In FIG. 11D, the first magnetic field emission structure 1012 is still further rotated until the attractive force becomes very small, such that the two magnetic field emission structures 1012 and 1022 are easily separated as shown in FIG. 11E. Given the two magnetic field emission structures 1012 and 1022 held somewhat apart as in FIG. 11E, the two magnetic field emission structures 1012 and 1022 can be moved closer and rotated towards alignment producing a small spatial force as in FIG. 11F. The spatial force increases as the two magnetic field emission structures 1012 and 1022 become more and more aligned in FIGS. 11G and 11H and a peak spatial force is achieved when aligned as in FIG. 11I. In this example, the second magnetic field emission structure 1022 is the mirror of the first magnetic field emission structure 1012 resulting in an attractive peak spatial force (see also FIGS. 3-4). In this example, the direction of rotation was arbitrarily chosen and may be varied depending on the code employed. Plus, it should be noted that the first part 1002 and the second part 1004 can be detached by applying a pull force, shear force, or any other force sufficient to overcome the attractive peak spatial force between the substantially aligned first and second magnetic field emission structures 1012 and 1022.

In this example, the first magnetic field emission structure 1012 is shown as three concentric circles of magnets 1012a which are located around the first electrical contact area 1014 (or opening 1014). And, the second magnetic field emission structure 1022 is shown as three concentric circles of magnets 1022a which are located around the second electrical contact area 1024 (or opening 1024). The first and second magnetic field emission structures 1012 and 1022 which are depicted in FIGS. 10-11 and in other drawings associated with other exemplary correlated magnetic connectors are themselves exemplary. Generally, the first and second magnetic field emission structures 1012 and 1022 could have many different configurations and could be many different types including for example permanent magnets, electromagnets, and/or electro-permanent magnets where their size, shape, source strengths, coding, and other characteristics can be tailored to meet different correlated magnetic connector requirements.

In operation, the user could pick-up the first part 1002 which incorporates the first magnetic field emission structure 1012. The user would then move the first part 1002 towards the second part 1004 which incorporates the second magnetic field emission structure 1022. Then, the user would align the first part 1002 with the second part 1004 such that the first part 1002 can be attached to the second part 1004 when the first and second magnetic field emission structures 1012 and 1022 are located next to one another and have a certain alignment with respect to one another where they correlate with each other to produce a peak attractive force (see FIGS. 11A and 11I). If the first part 1002 is attached to the second part 1004 then the first electrical contact area 1014 (or opening 1014) is connected to the second electrical contact area 1024 (or opening 1024). The user can release the first part 1002 from the second part 1004 by turning the first magnetic field emission structure 1012 relative to the second magnetic field emission structure 1022 so as to misalign the two field emission structures 1012 and 1022 (see FIGS. 11B-11E). If the first part 1002 is not attached to the second part 1004 then the first electrical contact area 1014 (or opening 1014) is not connected to the second electrical contact area 1024 (or opening 1024).

This process for attaching and detaching the first and second parts 1002 and 1004 is possible because each of the first and second magnetic field emission structures 1012 and 1022 includes an array of field emission sources 1012a and 1022a each having positions and polarities relating to a desired spatial force function that corresponds to a relative alignment of the first and second magnetic field emission structures 1012 and 1022 within a field domain. The field domain corresponds to first field emissions from the array of first field emission sources 1012a of the first magnetic field emission structure 1012 interacting with second magnetic field emissions from the array of second magnetic field emission sources 1022a of the second magnetic field emission structure 1022. Each field emission source 1012a and 1022a has a corresponding field emission amplitude and vector direction determined in accordance with the desired spatial force function, where a separation distance between the first and second magnetic field emission structures 1012 and 1022 and the relative alignment of the first and second magnetic field emission structures 1012 and 1022 creates a spatial force in accordance with the desired spatial force function. In one embodiment, the spatial force function being in accordance with a code, where the code corresponding to a code modulo of the first magnetic field emission sources 1012a and a complementary code modulo of the second magnetic field emission sources 1022a. The code defining a peak spatial force corresponding to substantial alignment of the code modulo of the first magnetic field emission sources 1012a with the complementary code modulo of the second magnetic field emission sources 1022a. The code also defining a plurality of off peak spatial forces corresponding to a plurality of different misalignments of the code modulo of the first magnetic field emission sources 1012a and the complementary code modulo of the second magnetic field emission sources 1022a. The plurality of off peak spatial forces having a largest off peak spatial force, where the largest off peak spatial force being less than half of the peak spatial force.

The two ends 1002 and 1004 described above can be electrical connectors, gas connectors, fluid connectors etc. For instance, if the two ends 1002 and 1004 form an electrical connector 1000 then such a connector can be used in a wide-variety of applications including (for example): an antenna connector; a battery connector; a coax connector; a fiber optic connector; a Universal Serial Bus (USB) connector; a High-Definition Multimedia Interface (HDMI) connector; and a power connector. These electrical connectors can be hermetically sealed. In addition, these electrical connectors can be self-cleaning due to the turning of the two ends 1002 and 1004 when connecting and disconnecting the two ends 1002 and 1004. If the two ends 1002 and 1004 form a gas connector 1000 then such a connector can be used in a wide-variety of applications including (for example): a natural gas connector; an oxygen connector; a nitrogen connector; and an air connector. If the two ends 1002 and 1004 form a fluid connector 1000 then such a connector can be used in a wide-variety of applications including (for example): pipes; tubing; conduit; and hydraulic connectors. Generally, the two ends 1002 and 1004 can have any type of configuration to create a wide-variety of connectors 1000 which have different sizes, shapes and functions.

Figure 12A:
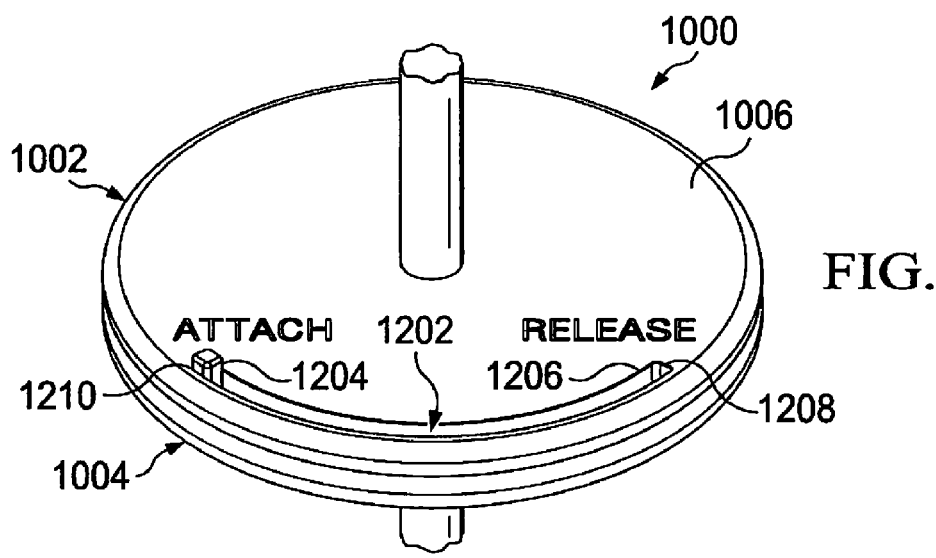
FIGS. 12A-12B are several diagrams of the correlated magnetic connector shown in FIGS. 10A-10D having an alignment mechanism in accordance with another embodiment of the present invention.
Figure 12B:
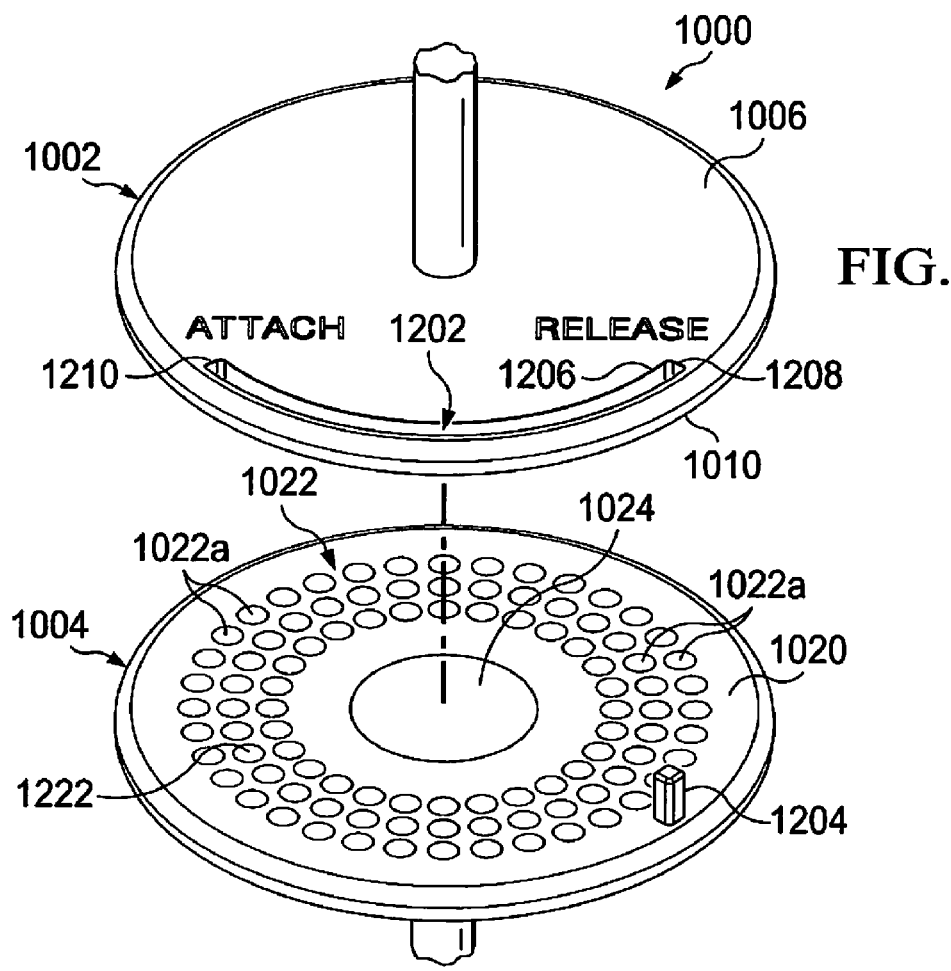

Referring to FIGS. 12A-12B, there are several diagrams of the exemplary correlated magnetic connector 1000 which has an alignment mechanism 1202 in accordance with another embodiment of the present invention. In this embodiment, the alignment mechanism 1202 includes a tab 1204 which extends outward from the second front surface 1020 of the second part 1004 and a channel 1206 formed within and extending through the first back surface 1006 and the first front surface 1010 of the first part 1002. In operation, the user can place the first part 1002 next to the second part 1004 such that the tab 1204 is located near one end 1208 (e.g., labeled "release") within the channel 1206 and then rotates either the first part 1002 or the second part 1004 such that the tab 1204 is located near another end 1210 (e.g., labeled "attach") to secure the two ends 1002 and 1004. For example, when the user rotates either the first part 1002 or the second part 10004 relative to one another and the tab 1204 is stopped by end 1208 of the channel 1206 then the first part 1002 can be separated from the second part 1004. And, when the user rotates either the first part 1002 or the second part 1004 relative to one another and the tab 1204 is stopped by another end 1210 of the channel 1206 then the first part 1002 is secured to the second part 1004. It should be appreciated that the alignment mechanism 1202 can have many different configurations instead of the tab 1204 and channel 1206 such as, for example, markings-notches on the first part 1002 and second part 1004 that indicate "release" and "attach". The alignment mechanism 1202 may be particularly useful when the first part 1002 and the second part 1004 have electrical cables 1008 and 1018 with conductors that should not be crossed or shorted during the rotation of the first part 1002 and the second part 1004 but should be aligned only when the first part 1002 is secured to the second part 1004.

Referring to FIGS. 13A-13D, there are several diagrams of the exemplary correlated magnetic connector 1300 that includes a first part 1302 which can be attached to and released from a second part 1304 in accordance with yet another embodiment of the present invention. The first part 1302 has a first back surface 1306 that has connected thereto a first electrical cable 1308 and a first front surface 1310 that has a first field emission structure 1312 which is located around a first electrical contact area 1314 which has flush therewith one or more first electrical contacts 1309 (two shown) (see FIGS. 13A-13C). The first electrical cable 1308 has one or more conductors 1307 (two shown) located therein that are respectively connected to the first electrical contact(s) 1309. The second part 1304 has a second back surface 1316 that has connected thereto a second electrical cable 1318 and a second front surface 1320 that has a second magnetic field emission structure 1322 which is located around a second electrical contact extension 1324 which has flush therewith one or more second electrical contacts 1311 (two shown) (see FIGS. 13A-13B and 13D). The second electrical cable 1318 has one or more conductors 1313 (two shown) located therein that are respectively connected to the second electrical contact(s) 1311. Plus, the first and second magnetic field emission structures 1312 and 1322 each comprise an array of field emission sources 1312a and 1322a (e.g., an array of magnets 1312a and 1322a) each having positions and polarities relating to a desired spatial force function that corresponds to a relative alignment of the first and second magnetic field emission structures 1312 and 1322 within a field domain (see discussions related to correlated magnetic connector 1000 and correlated magnet technology).

The correlated magnetic connector 1300 also includes a support unit 1326 that has a face plate 1328 with a first surface 1330 having one or more guide pins 1332 (two shown) protruding therefrom where the first part 1302 is slidably attached to the guide pins 1332 in a manner to freely move away from or towards the first surface 1330. The face plate 1328 also has a second surface 1334 (opposite the first surface 1330) configured to interface with the second part 1304 such that when the second part 1304 is adjacent to and contacting the second surface 1334 and the first magnetic field emission structure 1312 has the certain alignment with the second magnetic field emission structure 1322 then the first part 1304 is pulled toward so at to contact the first surface 1330.

Figure 13A:
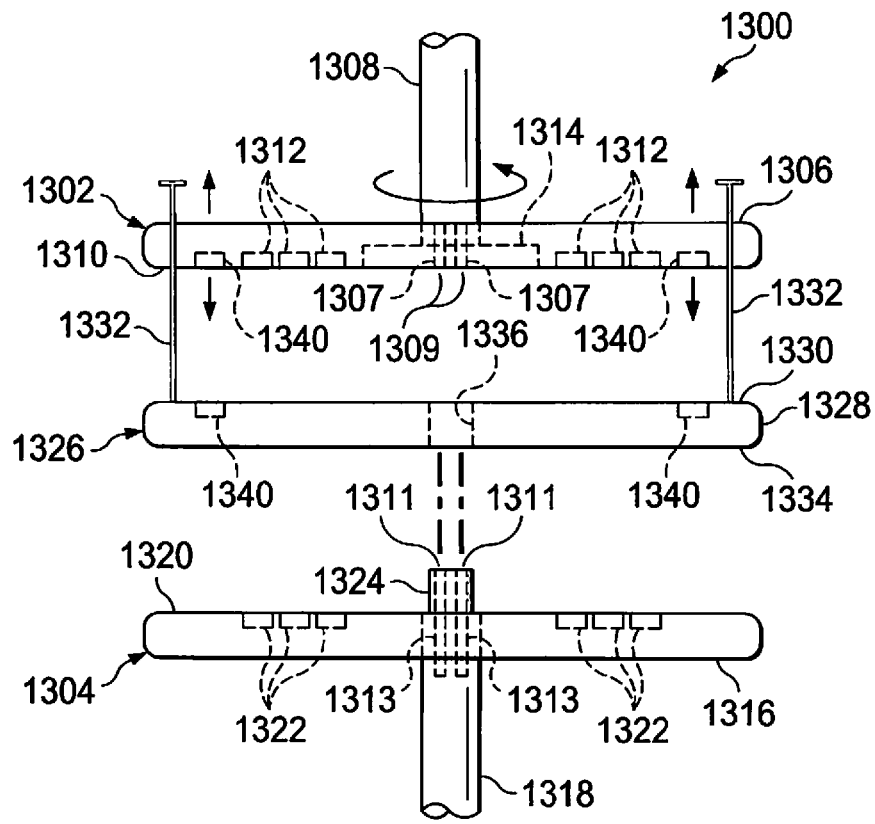
FIGS. 13A-13D are several diagrams of an exemplary correlated magnetic connector in accordance with yet another embodiment of the present invention.
Figure 13B:
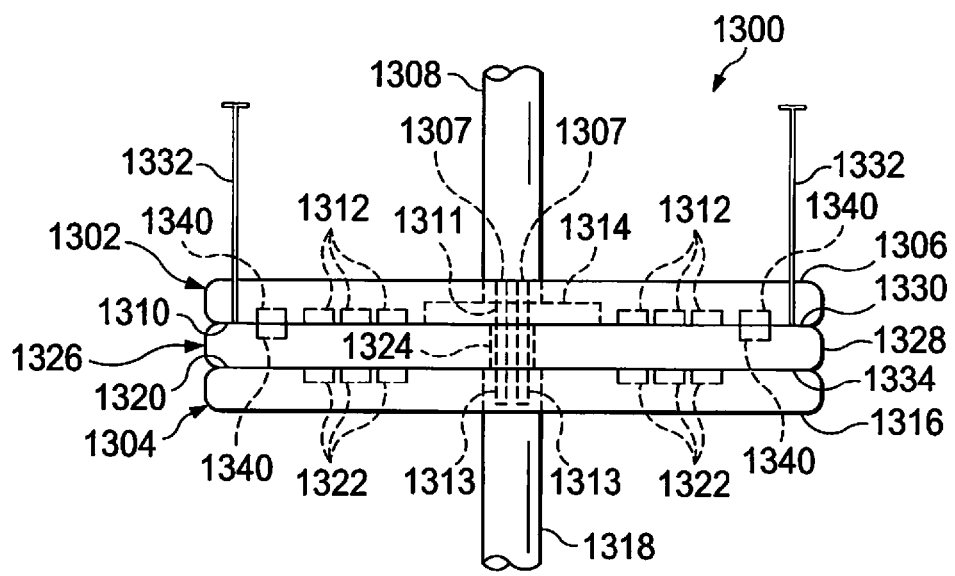
Figure 13C:
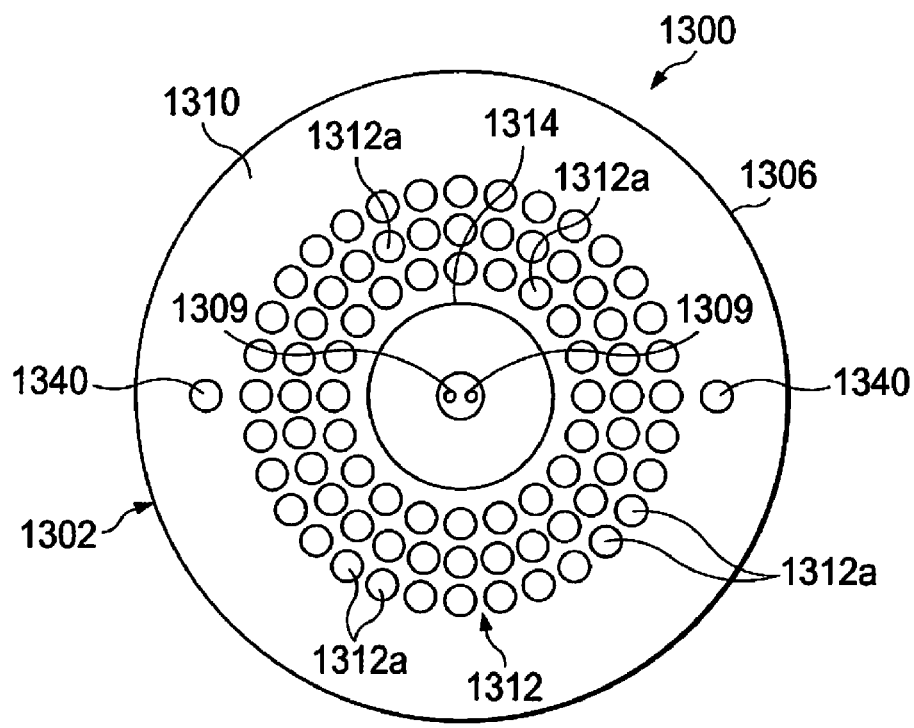
Figure 13D:
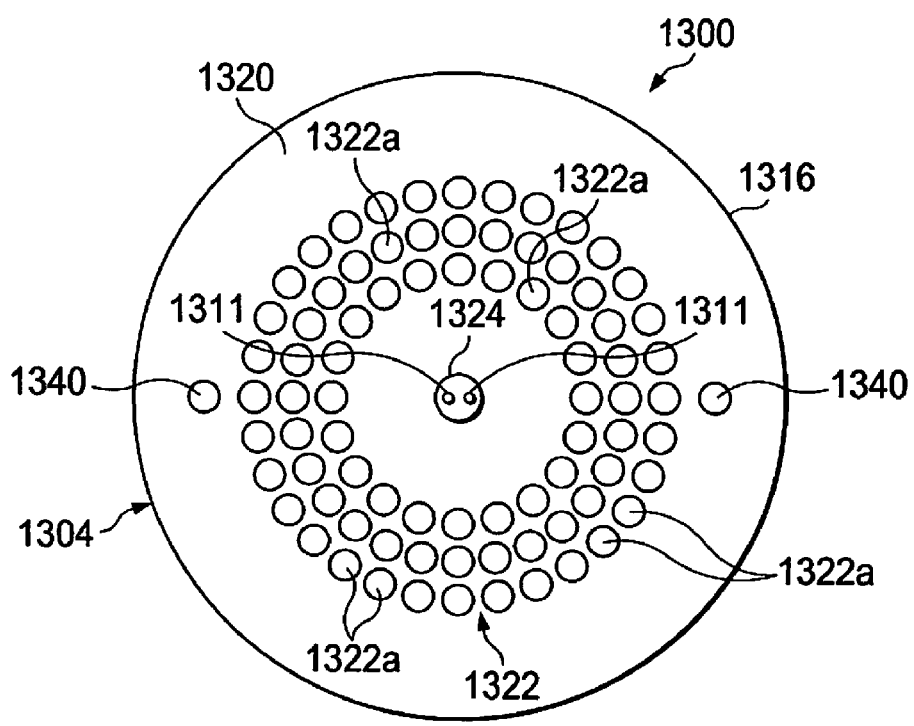

In this example, the face plate 1328 has one opening 1336 through which passes the second electrical contact extension 1324 so that the second electrical contacts 1311 (flush with the second electrical contact area 1324) interface with the first electrical contacts 1309 (flush with the first electrical contact area 1314) on the first part 1302 when the first part 1302 is adjacent (contacting) to the first surface 1330 and the second part 1304 is properly aligned and adjacent (contacting) to the second surface 1334 (see FIG. 13B). One skilled in the art will appreciate that there are many ways one could design the second electrical contract extension 1324 and the second electrical contacts 1311 so they can interface with the first electrical contacts 1309 on the first part 1302. If desired, the second surface 1334 and the second part 1304 each can have markings thereon to indicate the proper orientation so the second part 1304 can be easily aligned with the first part 1302. Plus, the first part 1302 and the first surface 1330 can each have one or more repealing field emission structures 1340 located thereon which cause the first part 1302 to be located away from the first surface 1330 except when the second part 1304 is adjacent to the second surface 1334 and the first magnetic field emission structure 1312 has a certain alignment with the second magnetic field emission structure 1322. As can be seen, the correlated magnetic connector 1300 forms a safe and effective electrical connector where if the first part 1304 has electrical contacts 1309 with live power then those electrical contacts 1309 will not be accessible until the second part 1304 is placed on the face plate 1328 in the appropriated orientation so as to move the first part 1302 towards the second part 1304 to make an electrical connection.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims. It should also be noted that the reference to the "present invention" or "invention" used herein relates to exemplary embodiments and not necessarily to every embodiment that is encompassed by the appended claims.

The invention claimed is:

1. A correlated magnetic connector, comprising:
a first part including a first magnetic field emission structure; and
a second part including a second magnetic field emission structure, where the first part is attached to the second part when the first and second magnetic field emission structures are located next to one another and have a certain alignment with respect to one another, where each of the first and second magnetic field emission structures include field emission sources having positions and polarities relating to a desired spatial force to function that corresponds to a relative alignment of the first and second magnetic field emission structures within a field domain, said spatial force function being in accordance with a code, said code corresponding to a code modulo of said first plurality of field emission sources and a complementary code modulo of said second plurality of field emission sources, said code defining a peak spatial force corresponding to substantial alignment of said code modulo of said first plurality of field emission sources with said complementary code modulo of said second plurality of field emission sources, said code also defining a plurality of off peak spatial forces corresponding to a plurality of different misalignments of said code modulo of said first plurality of field emission sources and said complementary code modulo of said second plurality of field emission sources, said plurality of off peak spatial forces having a largest off peak spatial force, said largest off peak spatial force being less than half of said peak spatial force.

2. The correlated magnetic connector of claim 1, wherein the first part is released from the second part when the first magnetic field emission structure is turned with respect to the second magnetic field emission structure.

3. The correlated magnetic connector of claim 1, wherein:
the first part further includes a first surface contact; and
the second part further includes a second surface contact, where the first surface contact is aligned with and connected to the second surface contact when the first part is attached to the second part.

4. The correlated magnetic connector of claim 3, wherein the first and second surface contacts are flush electrical contacts.

5. The correlated magnetic connector of claim 1, wherein:
the first part further includes a first opening; and
the second part further includes a second opening, where the first opening is aligned with and connected to the second opening when the first part is attached to the second part.

6. The correlated magnetic connector of claim 1, wherein:
the first part further includes a tab protruding up therefrom; and
the second part further includes a channel formed therein, wherein when the first part is adjacent to the second then the tab would be located within the channel, wherein the tab and the channel form an alignment mechanism.

7. The correlated magnetic connector of claim 1, further comprising:
a support unit including a face plate with a first surface having at least one guide pin protruding therefrom where the first part is slidably attached to the at least one guide pin to freely move away from or towards the first surface, where the face plate has a second surface configured to interface with the second part such that when the second part is adjacent to the second surface and the first magnetic field emission structure has the certain alignment with the second magnetic field emission structure then the first part is adjacent to the first surface.

8. The correlated magnetic connector of claim 7, wherein the face plate has at least one opening therein through which at least one electrical contact from the second part passes to interface with at least one electrical contact on the first part when the second part is adjacent to the second surface and the first part is adjacent to the first surface.

9. The correlated magnetic connector of claim 8, wherein the first surface and the first part each have at least one repelling field emission structure located thereon which cause the first part to be pushed away from the first surface except when the second part is adjacent to the second surface and the first magnetic field emission structure has the certain alignment with the second magnetic field emission structure.

10. The correlated magnetic connector of claim 1, wherein said positions and said polarities of each of said field emission sources are determined in accordance with at least one correlation function.

11. The correlated magnetic connector of claim 10, wherein said at least one correlation function is in accordance with at least one code.

12. The correlated magnetic connector of claim 11, wherein said at least one code is at least one of a pseudorandom code, a deterministic code, or a designed code.

13. The correlated magnetic connector of claim 11, wherein said at least one code is one of a one dimensional code, a two dimensional code, a three dimensional code, or a four dimensional code.

14. The correlated magnetic connector of claim 1, wherein each of said field emission sources has a corresponding field emission amplitude and vector direction determined in accordance with the desired spatial force function, wherein a separation distance between the first and second magnetic field emission structures and the relative alignment of the first and second magnetic field emission structures creates a spatial force in accordance with the desired spatial force function.

15. The correlated magnetic connector of claim 14, wherein said spatial force include at least one of an attractive spatial force or a repellant spatial force.

16. The correlated magnetic connector of claim 14, wherein said spatial force corresponds to a peak spatial force of said desired spatial force function when said first and second magnetic field emission structures are substantially aligned such that each field emission source of said first magnetic field emission structure substantially aligns with a corresponding field emission source of said second magnetic field emission structure.

17. The correlated magnetic connector of claim 1, wherein said field domain corresponds to first magnetic field emissions from said field emission sources of said first magnetic field emission structure interacting with second magnetic field emissions from said second magnetic field emission sources of said second magnetic field emission structure.

18. The correlated magnetic connector of claim 1, wherein said polarities of the field emission sources include at least one of North-South polarities or positive-negative polarities.

19. The correlated magnetic connector of claim 1, wherein at least one of said field emission sources includes a magnetic field emission source or an electric field emission source.

20. The correlated magnetic connector of claim 1, wherein at least one of said field emission sources include a permanent magnet, an electromagnet, an electret, a magnetized ferromagnetic material, a portion of a magnetized ferromagnetic material, a soft magnetic material, or a superconductive magnetic material.

21. A method for using a correlated magnetic connector which has a first part and a second part, the method comprising the steps of:
moving the first part which has a first magnetic field emission structure towards the second part which has a second magnetic field emission structure; and
turning the first part relative to the second part to align the first and second magnetic field emission structures so the first part attaches to the second part when the first and second magnetic field emission structures are located next to one another and have a certain alignment with respect to one another, where each of the first and second magnetic field emission structures include field emission sources having positions and polarities relating to a desired spatial force function that corresponds to a relative alignment of the first and second magnetic field emission structures within a field domain, said spatial force function being in accordance with a code, said code corresponding to a code modulo of said first plurality of field emission sources and a complementary code modulo of said second plurality of field emission sources, said code defining a peak spatial force corresponding to substantial alignment of said code modulo of said first plurality of field emission sources with said complementary code modulo of said second plurality of field emission sources, said code also defining a plurality of off peak spatial forces corresponding to a plurality of different misalignments of said code modulo of said first plurality of field emission sources and said complementary code modulo of said second plurality of field emission sources, said plurality of off peak spatial forces having a largest off peak spatial force, said largest off peak spatial force being less than half of said peak spatial force.

22. The method of claim 21, further comprising a step of turning the first part relative to the second part to remove the first part from the second part.

23. The method of claim 21, wherein the correlated magnetic connector is a correlated magnetic electrical connector, a correlated magnetic fluid connector, or a correlated magnetic gas connector.

* * * * *

UNITED STATES PATENT AND TRADEMARK OFFICE
CERTIFICATE OF CORRECTION

| | | |
|---|---|---|
| PATENT NO. | : 7,834,729 B1 | Page 1 of 1 |
| APPLICATION NO. | : 12/783409 | |
| DATED | : November 16, 2010 | |
| INVENTOR(S) | : Larry W. Fullerton and Mark D. Roberts | |

It is certified that error appears in the above-identified patent and that said Letters Patent is hereby corrected as shown below:

On the title page:
Item (73), replace "Assignee: Cedar Redge Research, LLC" with --Assignee: Cedar Ridge Research, LCC--.

Signed and Sealed this
Eighth Day of March, 2011

David J. Kappos
*Director of the United States Patent and Trademark Office*